(12) United States Patent
Luthra et al.

(10) Patent No.: US 12,466,554 B2
(45) Date of Patent: Nov. 11, 2025

(54) SYSTEM, METHOD AND APPARATUS FOR INSTALLATION OF CONDITION MONITORING SENSORS

(71) Applicant: VALMONT INDUSTRIES, INC., Omaha, NE (US)

(72) Inventors: Anil Luthra, Omaha, NE (US); Aaron Schapper, Omaha, NE (US); Kent Blobaum, Omaha, NE (US); Jacob Lahmann, Omaha, NE (US)

(73) Assignee: VALMONT INDUSTRIES, INC., Omaha, NE (US)

( * ) Notice: Subject to any disclaimer, the term of this patent is extended or adjusted under 35 U.S.C. 154(b) by 0 days.

(21) Appl. No.: 18/675,218

(22) Filed: May 28, 2024

(65) Prior Publication Data

US 2024/0308659 A1    Sep. 19, 2024

Related U.S. Application Data

(62) Division of application No. 17/148,957, filed on Jan. 14, 2021, now Pat. No. 12,060,152.

(60) Provisional application No. 62/962,239, filed on Jan. 17, 2020.

(51) Int. Cl.
   *B64D 1/00*    (2006.01)
   *B65G 47/90*   (2006.01)

(52) U.S. Cl.
   CPC ............ *B64D 1/00* (2013.01); *B65G 47/90* (2013.01)

(58) Field of Classification Search
   CPC .................................. B64D 1/00; B65G 47/90
   See application file for complete search history.

(56) References Cited

U.S. PATENT DOCUMENTS

| 10,434,395 | B1 | 10/2019 | Palardis |
| 10,717,190 | B2 * | 7/2020 | Bosworth ............ B25J 15/0266 |
| 10,793,272 | B2 * | 10/2020 | Shannon ................... B64D 1/22 |
| 11,840,333 | B2 * | 12/2023 | Sweeny .................... B64D 1/10 |
| 2017/0297738 | A1 * | 10/2017 | Von Flotow ............ B64D 1/12 |
| 2019/0092468 | A1 | 3/2019 | Deutsch |
| 2019/0161190 | A1 * | 5/2019 | Gil .......................... E05F 15/77 |
| 2019/0263521 | A1 * | 8/2019 | O'Brien ................... B64D 1/12 |

FOREIGN PATENT DOCUMENTS

| CN | 109890701 | * | 6/2019 | ............. B64D 1/22 |
| JP | WO 2019059394 | * | 3/2019 | ............. B64D 1/00 |

\* cited by examiner

*Primary Examiner* — Ronald P Jarrett
(74) *Attorney, Agent, or Firm* — Milligan PC LLO (57) ABSTRACT

The present invention provides a system and method for monitoring conditions within an electrical distribution system. According to a first preferred embodiment, the present invention provides a sensor module delivery system which uses UAVs to deploy sensor modules within the electrical distribution system. According to a first preferred embodiment, the system includes a drone mounting system and a gripper mechanism for attaching to a sensor module. The system also includes an extended carbon fiber shaft which vertically extends down from the drone mounting system and which supports a controller module, a transceiver, a battery module, a camera and the gripper mechanism. According to a further preferred embodiment, the gripper mechanism includes two or more gripping arms which are movable by the controller module between a first open position and a second closed position.

6 Claims, 10 Drawing Sheets

SYSTEM, METHOD AND APPARATUS FOR INSTALLATION OF CONDITION MONITORING SENSORS

RELATED APPLICATIONS

The present application is a division of U.S. Non-Provisional application Ser. No. 17/148,957 filed Jan. 14, 2021, which claims priority to U.S. Provisional Application No. 62/962,239 filed Jan. 17, 2020.

BACKGROUND AND FIELD OF THE PRESENT INVENTION

Field of the Present Invention

The present invention relates generally to a system and method for monitoring conditions within an electrical distribution system. More specifically, the present invention relates to a system, method and apparatus for installing and communicating with sensors attached to power distribution poles and electrical components.

Background of the Invention

Electrical distribution systems cover thousands of miles. These systems carry power from power generating stations through primary transmission networks and secondary transmission networks to reach primary distribution systems. These distribution networks are made up of transmission lines, transformers, breakers and switches, which are for the most part suspended on electrical poles.

To monitor and inspect an electrical transmission network requires extensive time and expense. Just inspecting a single transmission point can require several hours. To address this issue, systems of the prior art have suggested using drones or Unmanned Arial Vehicles (UAVs) to travel to and monitor electrical lines and components. For example, Publication No. WO2019160453A1 teaches the use of drone devices for monitoring the condition of electrical transmission lines. This solution includes attaching a wire to an electrical transmission line and using a sleeve that is capable of sliding along the guide. Likewise, Russian Patent No. 2558002C1 teaches using helicopter type aircraft to install a device for receiving diagnostics from an overhead power transmission line. A further example is Russian Patent No. 2421746C1 which teaches using a UAV having sensors located in its wings to measure electric field intensity from high-voltage power lines. U.S. Publ. No. US2017015415A1 also teaches a UAV which is configured to interface with utility transmission systems to draw power for the UAV.

In terms of attached devices, U.S. Publ. No. US2006114122A1 teaches an inspection device which attaches to a power line and travels down the power line using power from the power line. Similarly, U.S. Publ. No. US2016313209A1 teaches a utility pole monitoring system which includes having monitoring devices mounted to a plurality of utility tower/poles.

Each system of the prior art fails to provide a complete monitoring solution for overhead power lines and components. Primarily, the prior art systems teach UAVs and sensors which must be attached to electrical lines. These sorts of systems can only provide limited information. Additionally, the systems of the prior art fail to provide solutions to maximize the potential of drones to deploy sensors. Further, the prior art systems teach diagnostic devices which are poorly designed for reliable deployment and system monitoring.

SUMMARY OF THE PRESENT INVENTION

To address the shortcomings presented in the prior art, the present invention provides a system for monitoring conditions within an electrical distribution system which includes a drone connection system and controller to transport, position and deploy a monitoring device.

According to a first preferred embodiment, the present invention provides a sensor module delivery system which uses UAVs to deploy sensor modules within the electrical distribution system. According to a first preferred embodiment, the system includes a drone mounting system and a gripper mechanism for attaching to a sensor module.

According to a further preferred embodiment, the system includes an extended carbon fiber shaft which vertically extends down from the drone mounting system and which supports a controller module, a transceiver, a battery module, a camera and the gripper mechanism.

According to a further preferred embodiment, the gripper mechanism includes two or more gripping arms which are movable by the controller module between a first open position and a second closed position.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. Memory and data storage means, as defined herein, includes many different types of computer readable media that allow a computer to read data therefrom and that maintain the data stored for the computer to be able to read the data again. Such memory and data storage means can include, for example, ROM, RAM, buffers, cache memory, and signals within network circuits.

Figure 1:
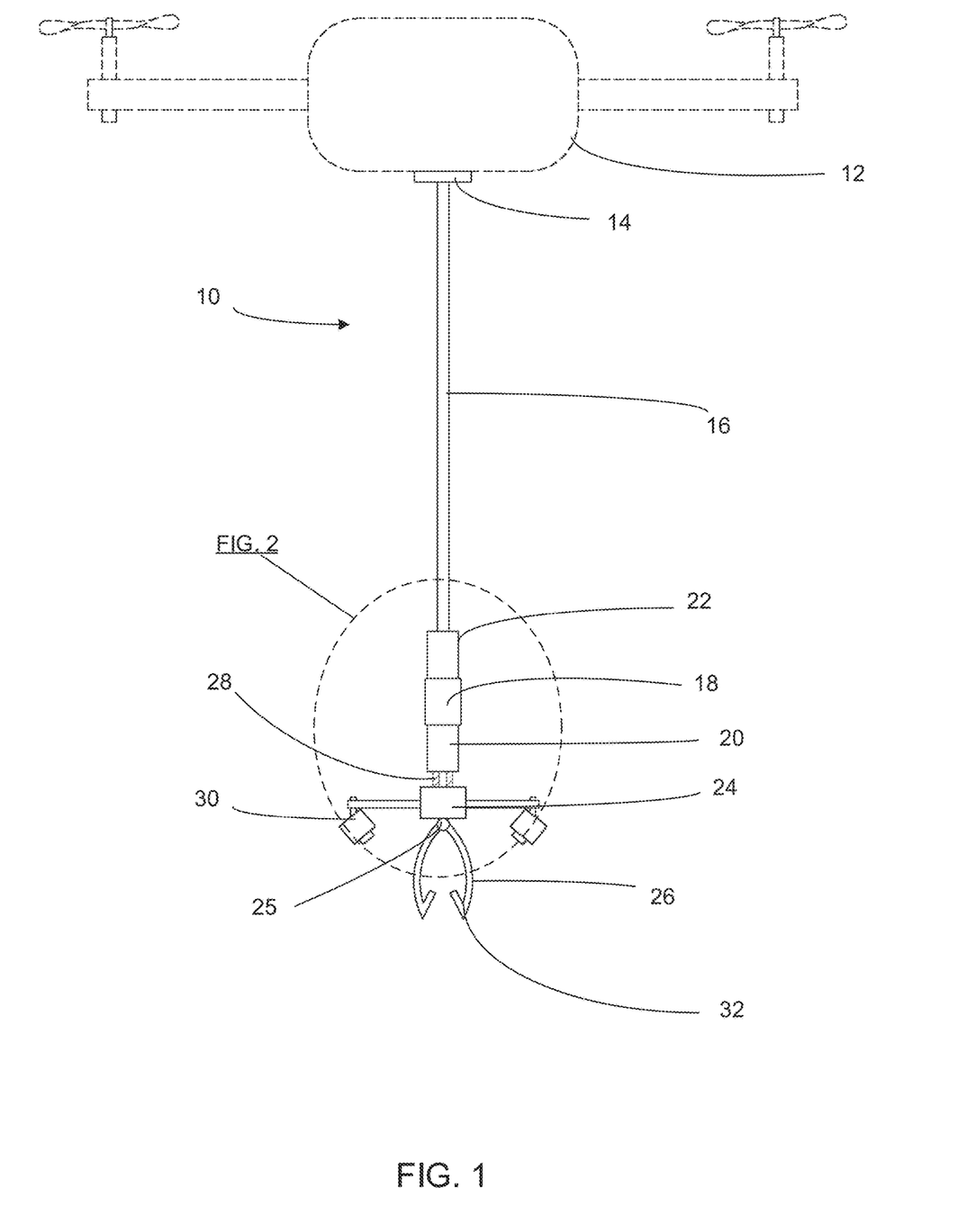
FIG. 1 shows an exemplary sensor delivery system of the present invention.
Figure 2:
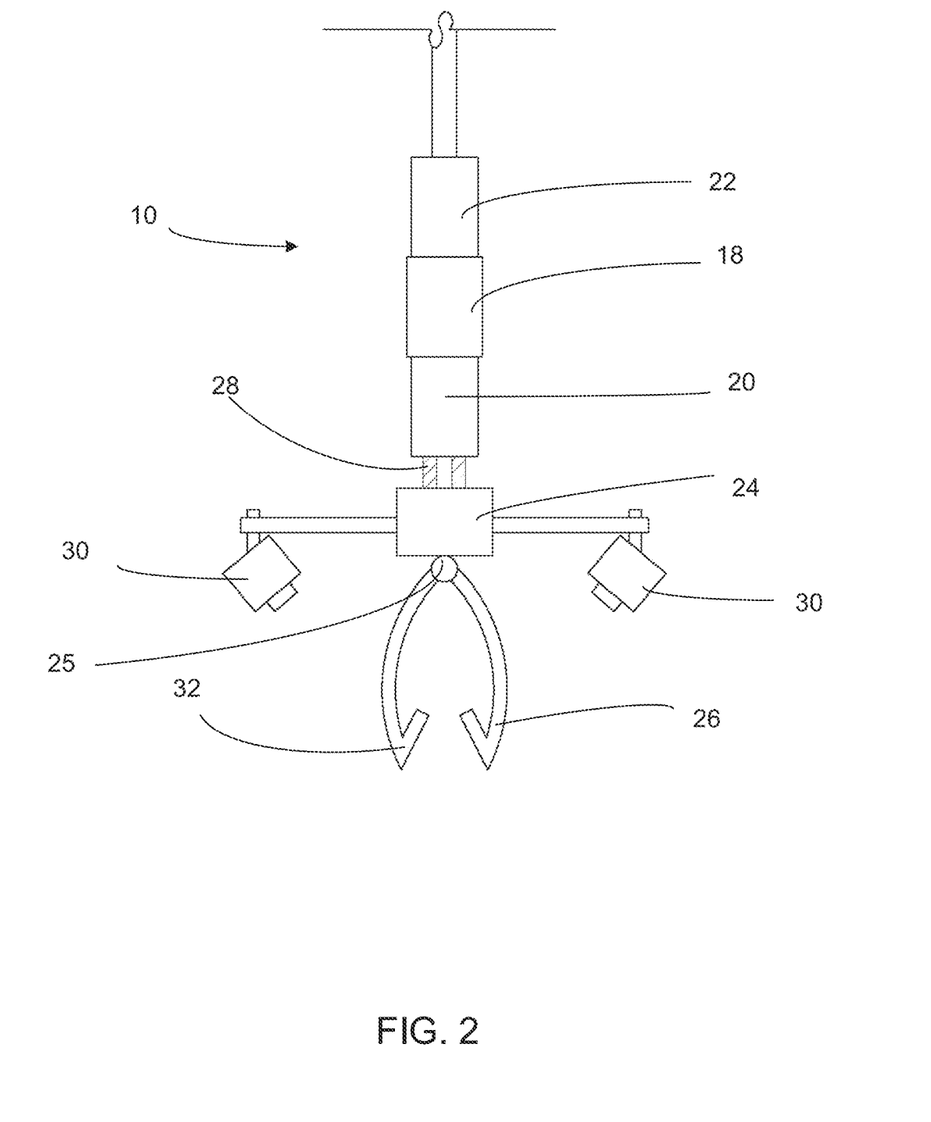
FIG. 2 shows an enlarged view of a portion of the sensory delivery system shown in FIG. 1.
Figure 3:
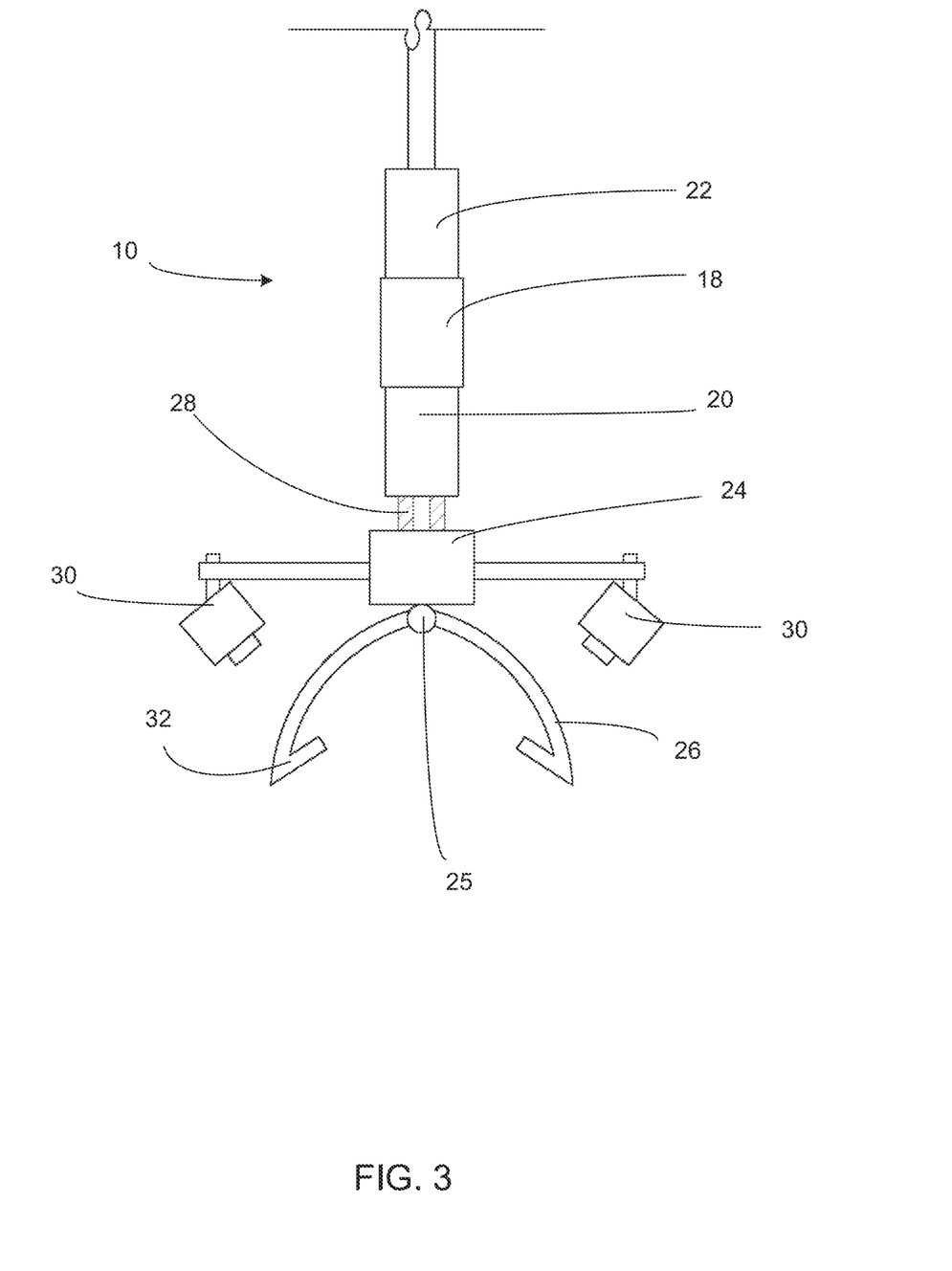
FIG. 3 shows the enlarged view of the sensor delivery system shown in FIG. 2 in a second configuration.

FIGS. 1-3 illustrate an example of a sensor delivery system 10 which may be used with example implementations of the present invention. The sensor delivery system 10 disclosed in FIGS. 1-3 represents only an exemplary system onto which the features of the present invention may be integrated. Accordingly, FIGS. 1-3 (and other examples within the present application) are intended to be illustrative and any of a variety of systems and arrangements may be used with the present invention without limitation.

Referring now to FIG. 1, an example sensor delivery system 10 is provided. As shown, the system 10 includes a mounting system 14 which is attachable to a drone 12 for transport. A variety of mounting systems may alternatively be used with the present invention without limitation. The mounting system 14 may, for example, incorporate a remotely controlled release to allow for the remote disconnection between the drone 12 and the delivery system 10 during emergency situations.

As shown, the mounting system 14 preferably attaches to an extended shaft 16 which allows an attached sensor to be a carried at distance from the drone 12. According to a preferred embodiment, the extended shaft 16 may preferably be formed of carbon fiber or other light-weight material. According to a further preferred embodiment, the extended shaft 16 may be a fixed length or may be retractable to vary the length during transport and sensor installation (e.g. retracted during transport and extended for sensor installation).

As shown in FIG. 1, the extended shaft 16 may preferably support system components such as controller module 18, a transceiver 22 and a battery 20. Although the controller module 18, transceiver 22 and battery 20 are shown in separate housings, these components may also be housed together in a single housing. Further, they may be positioned at other locations within the delivery system 10 without departing from the scope of the present invention. According to an alternative preferred embodiment, the delivery system 10 may also selectively rely on the power and control systems of the drone 12 during transport instead of using independent power and control.

Referring again to FIG. 1, the controller module 18 as shown is electrically connected to servo cables 28 which extend from the controller 18. The servo cables 28 may be connected to a servo motor 24 or the like. Preferably, the servo motor 24 may be incorporated with a two-axis articulating head to allow for powered movement of the gripper mechanism 26. According to alternative embodiments, the head and servo motors 24 may allow for 3-axis of movement. The servo cables 28 may also connect to servo motors 25 integrated within the gripper mechanism 26. According to a preferred embodiment, the gripper mechanism 26 may also include retractable retaining hooks 32. To carry and deploy sensors, the servo motor 24 may preferably move the gripper mechanism 26 and/or retaining hooks 32 between an open/retracted position and a closed, vertical position as discussed further below. Additionally, the controller module 18 may connect to one or more visual sensors/cameras 30 which are preferably spaced and positioned to provide views of the gripper mechanism 26, transported sensors and the like. According to alternative embodiments, the delivery system 10 may also include an electromagnetic device used with or in place of the gripper mechanism 26 to retrieve ferrous objects.

FIG. 2 shows an enlarged view of a portion of the sensory delivery system 10 shown in FIG. 1. In FIG. 2, the gripper mechanism 26 is shown in a closed, vertical position where the retaining hooks 32 are closely aligned. In the position shown in FIG. 3, the gripper mechanism 26 is in an open/retracted position with the retaining hooks 32 moved further away from each other.

Figure 5:
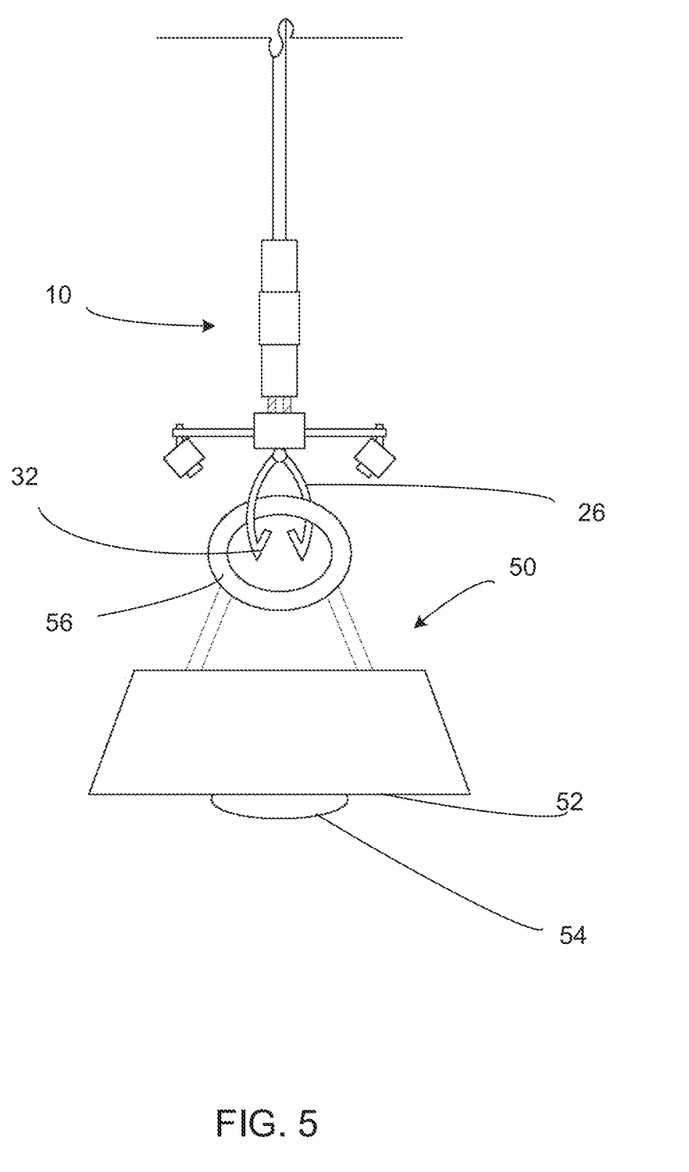
FIG. 5 shows a first view of an example sensor module attached to the exemplary sensor delivery system shown in FIGS. 1-3.

With reference now to FIG. 5, the exemplary sensor delivery system 10 discussed above is shown attached to an exemplary sensor module 50. The delivery system 10 of the present invention may transport and install any of a variety of sensor modules and exemplary module 50 is not intended to be limiting. Further, the exemplary sensor module 50 is shown enlarged relative to the sensor delivery system 10 for the purposes of explanation. The exemplary sensor module 50 may include an attachment point 56 for the delivery system which is sized to be secured within the gripper mechanism 26 and retractable retaining hooks 32. The sensor module may further include a magnet 54 or other attachment mechanism on the underside of the sensor housing 52. As discussed above, the gripper mechanism 26 in FIG. 5 is shown in a closed, vertical position where the retaining hooks 32 are closely aligned. In this position, the gripper mechanism 26 preferably is sized to secure and close around the sensor module 50 for transport.

Figure 6:
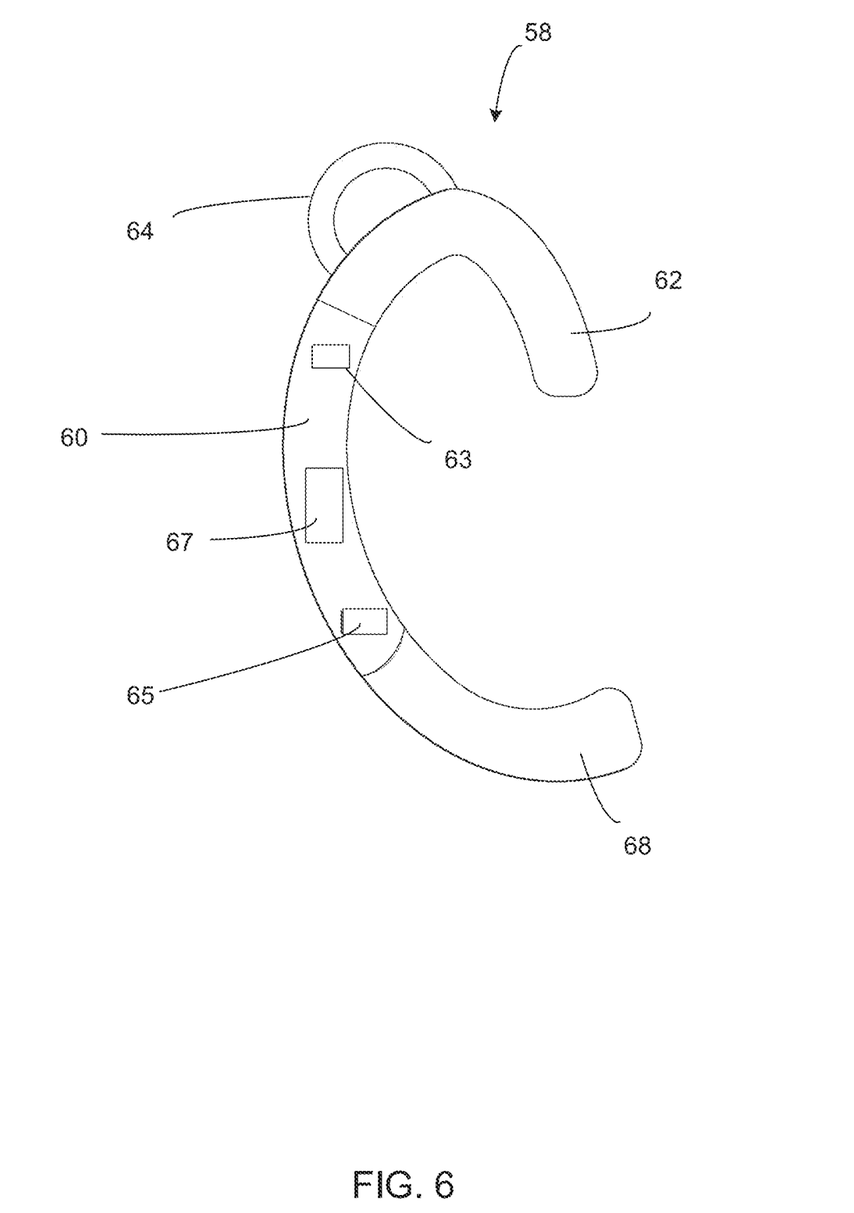
FIG. 6 shows an enlarged view of an alternative example sensor module for use with the present invention.
Figure 7:
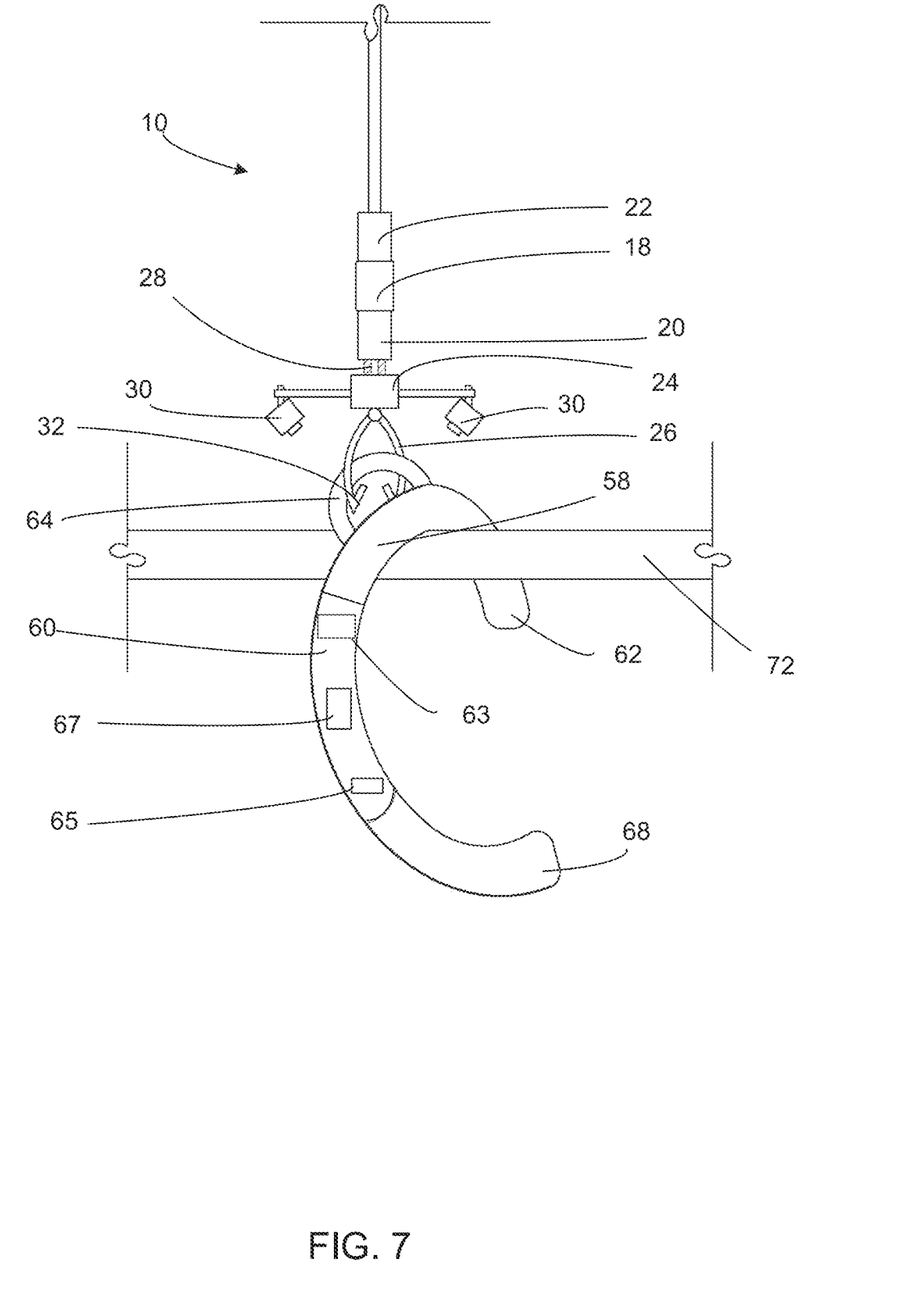
FIG. 7 shows the alternative sensor module of FIG. 6 attached to the exemplary sensor delivery system shown in FIGS. 1-3.

With reference now to FIG. 6, an alternative sensor module 58 is shown. As shown, the alternative sensor module 58 may include a main body 60 including an upper securing section 62 and a lower weighted end 68. As shown, the main body 60 may house the working elements of the sensor module 58 including elements such as a voltage/current meter 67, a magnetic field sensor 63, and a transceiver 65. The sensor module 58 may preferably also include a drone attachment point 64 for drone transport as discussed above. With reference now to FIG. 7, an illustration of the example sensor module 58 is shown being deployed from the delivery system 10 of the present invention onto an electrical line 72.

Figure 4:
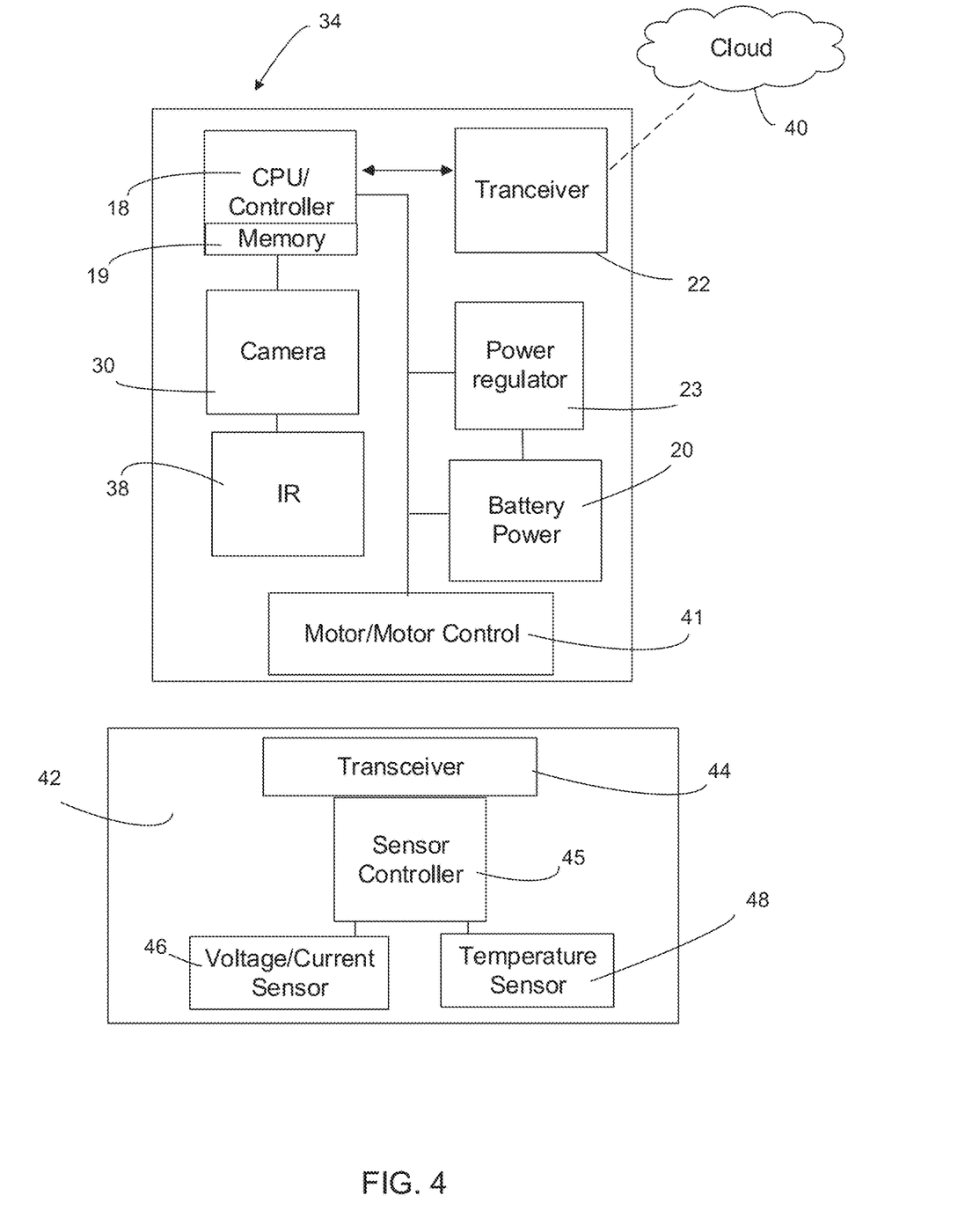
FIG. 4 shows a block diagram illustrating the exemplary processing architecture of the sensor delivery system shown in FIGS. 1-3 according with a first preferred embodiment of the present invention.

With reference now to FIG. 4, a block diagram illustrating an exemplary processing architecture of the sensor delivery system shown in FIGS. 1-3 is provided. As shown in FIG. 4, the control and monitoring systems 34 of the present invention may include a main CPU/controller 18, which may be a single component/chip or multiple distributed components to control one or more operational aspects of the sensor delivery system discussed herein. The CPU/controller 18 preferably provides processing functionality for the delivery system 10 and may include any number of processors, micro-controllers, or other processing systems to execute one or more software programs that implement techniques described herein. The system 34 may preferably also include memory 19, a transceiver 22, a battery 20, a power regulator 23, a motor/motor controller 41 and an imaging device such as a camera system 30 as discussed above. At least one camera system 30 preferably provides wireless imaging of the gripper mechanism 26 and any targets/sensors being deployed or retrieved. The wireless camera may preferably be remotely monitored. Alternatively, the camera 30 may instead transmit image data to the drone 12 which may then be accessed via the drone's exiting video downlink systems.

The system may also include other sensors such as infrared sensors (IR) 38 or the like. According to further preferred embodiments, the control and monitoring systems 34 of the present invention may also include additional devices such as an inertial measurement unit (i.e. accelerometer) and flight controller to stabilize movement of the shaft/arm during transport. Additionally, the sensor delivery system 10 may include onboard lighting to assist with gathering image data.

The transceiver 22 may preferably transmit and receive using any wired or wireless protocols for communicating between elements, including for instance: Wi-Fi, 3G, 4G, CDMA, TDMA, OSM, Ethernet, Bluetooth, Zigbee, MIMO and/or any other standards based or proprietary protocols capable of transmitting data. Additionally, the transceiver 22 and the memory systems 19 of the present invention may preferably receive and transmit information to remote processors and users (e.g. the cloud 40).

With further reference to FIG. 4, the CPU/controller 18 of the present invention preferably works the system components discussed above in order to transport, deploy and retrieve sensor elements 42. An exemplary sensor 42 according to the present invention may include components such as: an independent controller 45, a transceiver 44 and sensors such as voltage/current sensors 46, temperature sensors 48 and other sensing and imaging devices. The imaging devices included with the present invention may be included on the sensor delivery system 10 and on the a deployed sensor 42. The preferred imaging device for use with the present invention may include a range of imaging devices including but not limited to: laser scanners, CT scanners, laser tracking scanners, IR, white light scanners and the like.

Figure 8:
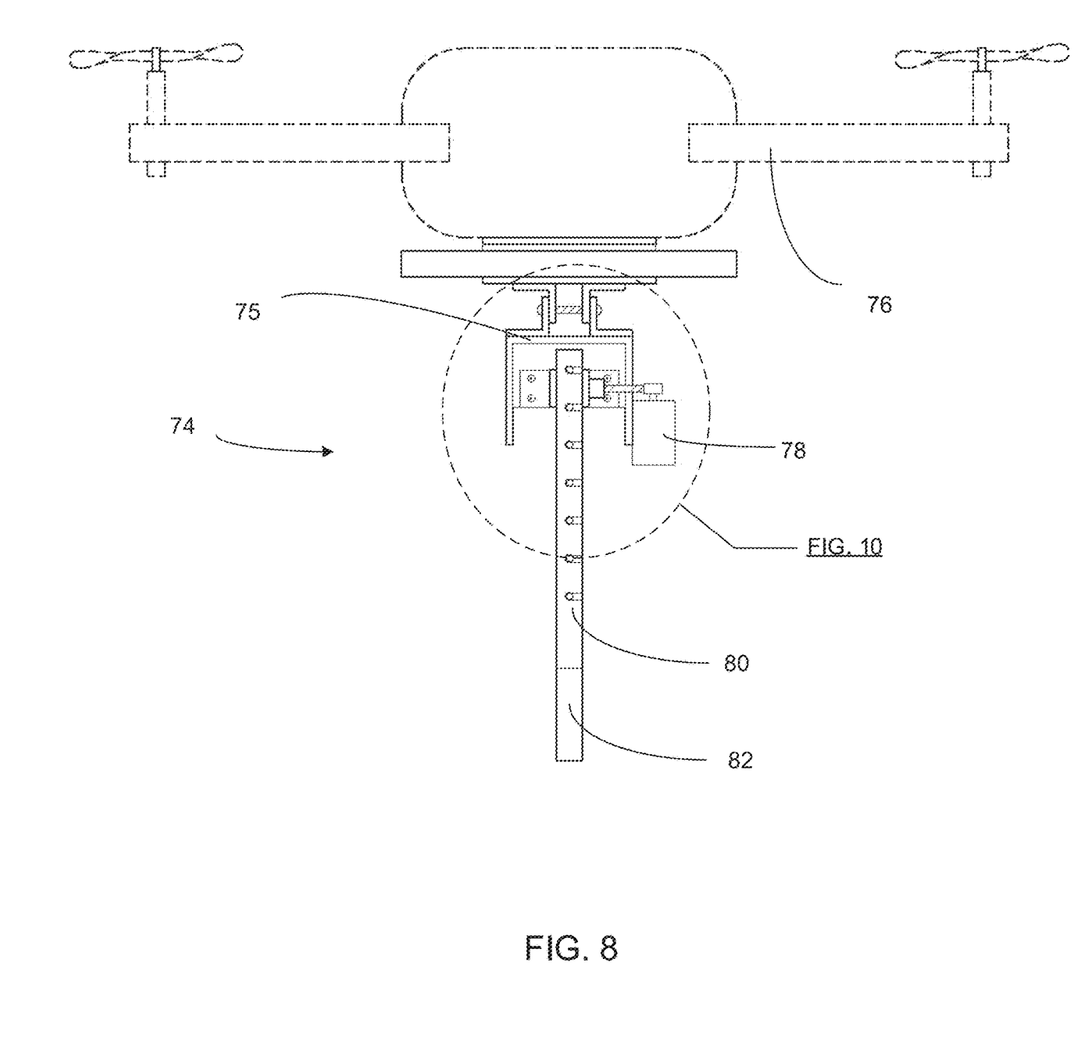
FIG. 8 shows an exemplary alternative sensor delivery system in accordance with aspects of the present invention.
Figure 9:
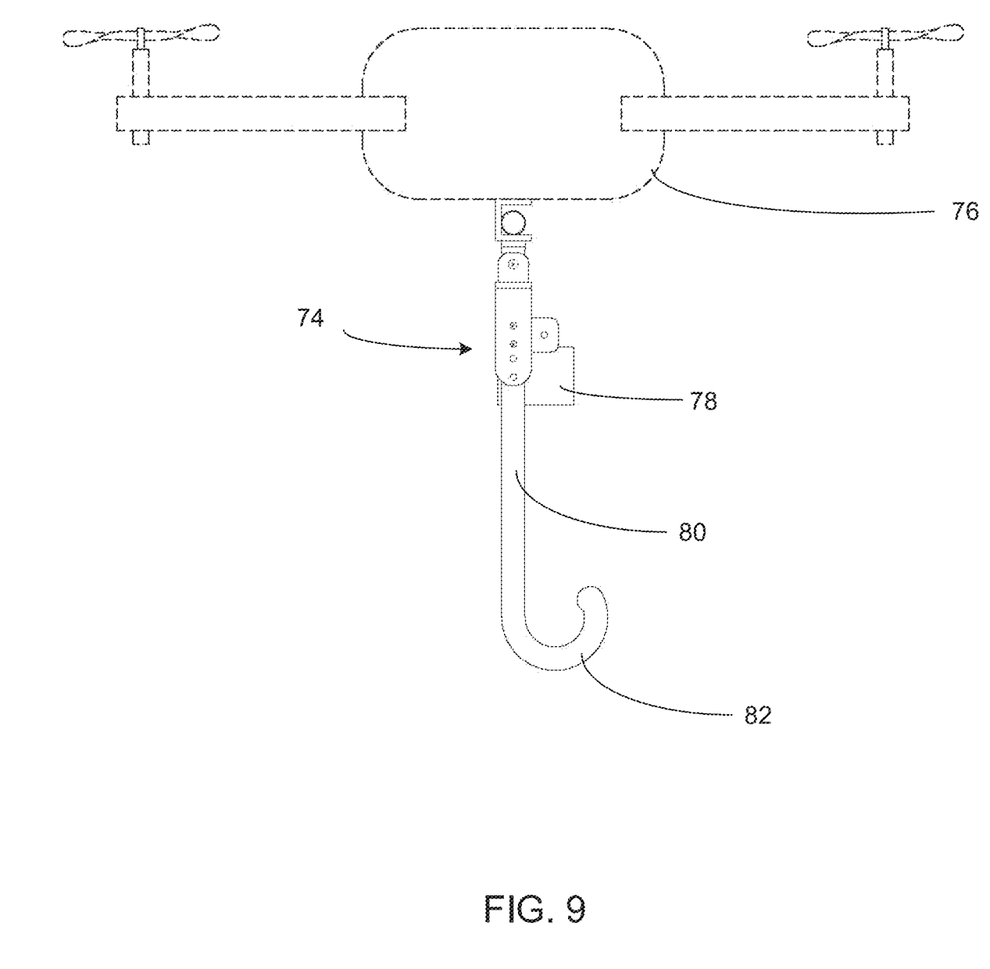
FIG. 9 shows a side view of the exemplary delivery system shown in FIG. 8.

With reference now to FIGS. 8 and 9, an exemplary alternative sensor delivery system 74 will now be discussed. As shown, the sensor delivery system 74 includes a delivery arm mounting system 75 for attachment and transport by a drone 76. As illustrated, the arm mounting system 75 includes a servo motor/controller 78 and a secured arm 80 which preferably includes a hook 82 and/or other clamping or grabbing mechanism.

Figure 10:
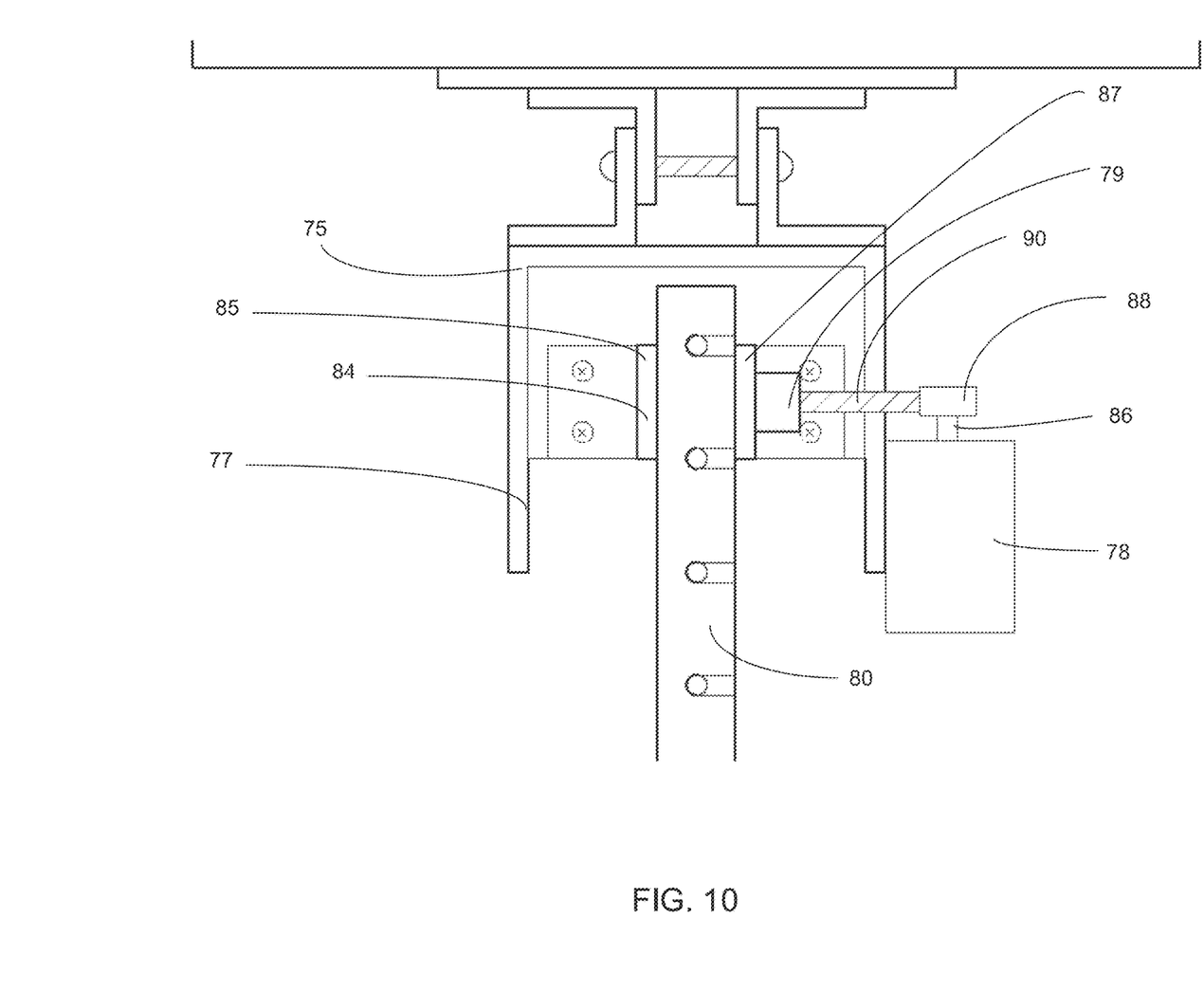
FIG. 10 shows an enlarged view of the portion of the sensor delivery system indicated in FIG. 8.

FIG. 10 shows an enlarged view of the arm mounting system 75 as indicated in FIG. 8. As shown in FIG. 10, the arm mounting system 75 preferably may include a securing frame 77. The securing frame 77 preferably engages/secures an arm securing slot 84 which includes a pair of lateral supporting walls 85, 87. The arm securing slot 84 preferably is sized to provide lateral support to an inserted securing arm 80. The inserted arm 80 may preferably be detachably mounted within the securing slot 84 by an arm release pin 90. In operation, the servo motor 78 may preferably laterally displace the arm release pin 90 via a servo output shaft 86, and one or more torque transfer elements 88. In this way, the servo motor/controller 78 may move the arm release pin 90 between a first securing position and a second release position. In the first securing position, the arm release pin 90 may preferably be inserted through the pin inlet 79 and into the body of the arm 80 thus retaining and securing the arm 80 within the arm securing slot 84. In the release position, the arm release pin 90 may preferably be retracted from the body of the arm 80 thus allowing the arm 80 to slide from within the arm insertion slot 84 and to become detached from the arm mounting system 75.

With respect to the embodiments shown in FIG. 8-10, the securing arm 80 of the present invention may preferably include multiple pin insertion points to allow the height of the arm to be adjusted. Additionally, the system may include multiple hooks and/or other attachment mechanisms. Preferably, any attachment mechanism may be adjustably positioned (both vertically and/or horizontally) in respect to the unmanned aerial vehicle. Additionally, the hook 80 is preferably designed to carry sensor payloads that have affixed cables, loops or other mechanical allowances that mate with the hook. The servo motor/controller 78 may preferably be remotely actuated to move the pin and consequently release the arm 80 and/or hook 82 and any connected payload. The servo motor/controller 78 may be integrated into the drone control system or may be electronically independent.

According to further preferred embodiments, the securing arm may preferably be modular so that a variety of hooks, electromagnets, grippers, adhesive surfaces, and the like may be attached and detached from the securing arm. Further, the securing slot may preferably be aligned in a variety of orientations so that the securing arm may be adjustably aligned horizontally, vertically or at any desired angle relative to the drone.

While the above descriptions regarding the present invention contain much specificity, these should not be construed as limitations on the scope, but rather as examples. Many other variations are possible. For example, the processing elements of the present invention may operate on a number of frequencies. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations such as computer, tablet or smart phone. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A sensor module delivery system, wherein the sensor module delivery system comprises:
   a drone mounting system, wherein the drone mounting system is configured to attach to a drone for transport; wherein the drone mounting system is configured to remotely disconnect the attachment to the drone;
   a shaft, wherein the shaft vertically extends down from the drone mounting system;
   a controller module;
   a transceiver;
   a gripper mechanism; and
   a camera, wherein the camera is configured to produce image data;
   wherein the controller module is functionally connected to at least a first servo cable; wherein the first servo cable is connected to at least a first servo motor and a second servo motor;

wherein the first servo motor is configured to move the gripper mechanism from a first closed position to a second opened position.

2. The system of claim 1, wherein the second servo motor is functionally connected to the gripper mechanism.

3. The system of claim 2, wherein the second servo motor is configured to move a retaining hook of at least one gripper arm between an open position and a closed position.

4. The system of claim 3, wherein the gripper mechanism comprises a plurality of gripping arms.

5. The system of claim 4, wherein each gripping arm comprises a retaining hook.

6. The system of claim 5, wherein the shaft is formed of carbon fiber.

\* \* \* \* \*